United States Patent [19]

Kato et al.

[11] Patent Number: 4,629,843
[45] Date of Patent: Dec. 16, 1986

[54] INDUCTION COOKING APPARATUS HAVING A FERRITE COIL SUPPORT

[75] Inventors: Namio Kato; Tadao Takeda, both of Chiba, Japan

[73] Assignee: TDK Corporation, Tokyo, Japan

[21] Appl. No.: 719,376

[22] Filed: Apr. 3, 1985

[30] Foreign Application Priority Data

Apr. 11, 1984 [JP] Japan ............................ 59-53207[U]
Apr. 11, 1984 [JP] Japan ............................ 59-53208[U]
Apr. 16, 1984 [JP] Japan ............................ 59-56477[U]
Apr. 16, 1984 [JP] Japan ............................ 59-56476[U]
Apr. 28, 1984 [JP] Japan ................................ 59-86747
Apr. 28, 1984 [JP] Japan ................................ 59-86748

[51] Int. Cl.$^4$ ............................................. H05B 6/12
[52] U.S. Cl. ........................... 219/10.49 R; 219/10.67; 219/10.79; 336/65; 336/84 M
[58] Field of Search ..................... 219/10.49 R, 10.67, 219/10.79; 336/65, 82, 84 M, 205

[56] References Cited

U.S. PATENT DOCUMENTS 3,928,744 12/1975 Hibino et al. ................. 219/10.49 R
4,029,926 6/1977 Austin .......................... 219/10.49 R
4,467,162 8/1984 Kondo et al. ................. 219/10.49 R Primary Examiner—Philip H. Leung
Attorney, Agent, or Firm—Wyatt, Gerber, Shoup, Scobey & Badie

[57] ABSTRACT

An induction cooking apparatus or a ceramics hob which heats conductive food and/or a conductive pan through hysteresis loss and/or eddy current loss by exciting a coil with high frequency power, comprises a casing, a coil mounted on a coil support, and an insulation cover plate between the coil and food to be cooked. The coil support is made of ferro-magnetic material of mixture of insulation resin and ferrite powder which occupies 75-85 weight %, instead of a prior mere insulation resin so that no flux leaks below the coil support. Preferably, the coil support has a plurality of longitudinal ferrite ribs extending radially under the coil support, and still preferably, the coil support has a plurality of holes at the central portion of the same so that permeability at the central portion is essentially smaller than that at the outer portion to provide uniform flux.

21 Claims, 15 Drawing Figures

INDUCTION COOKING APPARATUS HAVING A FERRITE COIL SUPPORT

BACKGROUND OF THE INVENTION

The present invention relates to an electromagnetic induction heater device, which is sometimes called a ceramics hob and is used as an induction burner.

A prior induction heater or an induction burner is shown in FIG. 1, in which the numeral 1 is a flat coil support made of heat-resisting insulation material, 2 is a coil mounted on said coil support 1, 3 is a housing, 4 is a heat-resisting insulation cover plate, and 5 is a load which is for instance a pan for cooking. The coil 2 is made of a litz wire.

When the coil 2 is energized by high frequency power (for instance, 20-40 kHz), the load 5 is heated by eddy current loss and/or induction loss of electromagnetic flux field generated by the coil 2.

However, a prior induction burner has the disadvantage as follows.

Since the coil support 1 is made of heat-resisting insulation material, the electromagnetic field generated by the coil 2 leaks behind the support 1. The leakage flux is even as high as the effective front field. As some electronic devices, like a high frequency power source (not shown), is mounted in the housing, that device is also heated by the flux by the coil 2 itself.

SUMMARY OF THE INVENTION

It is an object of the present invention to overcome the disadvantages and limitations of a prior induction heater burner by providing a new and improved induction heater burner.

It is also an object of the present invention to provide an induction heater burner which heats only load on the front surface, but does not heat the underneath devices.

The above and other objects are attained by an induction heater burner comprising a casing, a coil support mounted in the casing, a coil located on the upper plane of the coil support and being energized by high frequency power, an insulation plate covering the casing to provide a support for a load, said coil support being essentially a flat disc made of a mixture of heat-resisting insulation resin and ferrite powder so that the weight ratio of ferrite powder is in the range between 75% and 85%.

Preferably, said coil support has a plurality of longitudinal ferrite ribs extending radially on the bottom plane of the coil support.

Still preferably, said coil support has a Curie point higher than 150° C.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
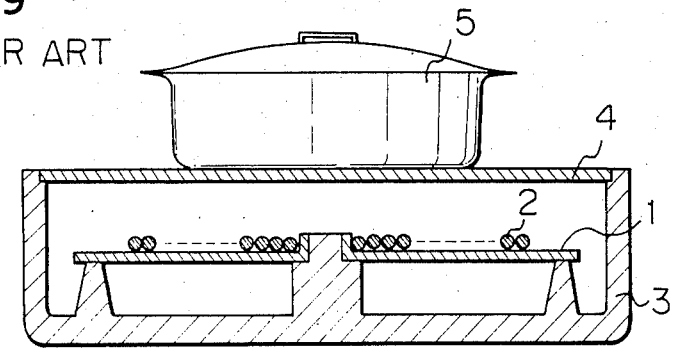
FIG. 1 is a cross section of a prior induction heater burner.
Figure 2:
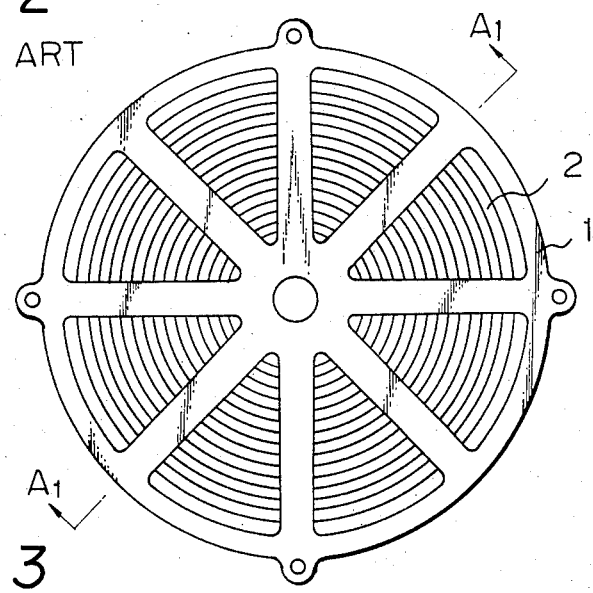
FIG. 2 is a bottom view of an induction coil.
Figure 3:
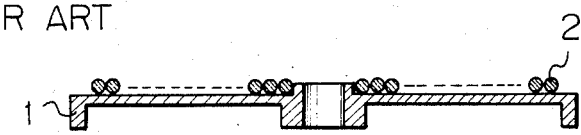
FIG. 3 is a cross section along the line A1—A1 of FIG. 2.
Figure 4:
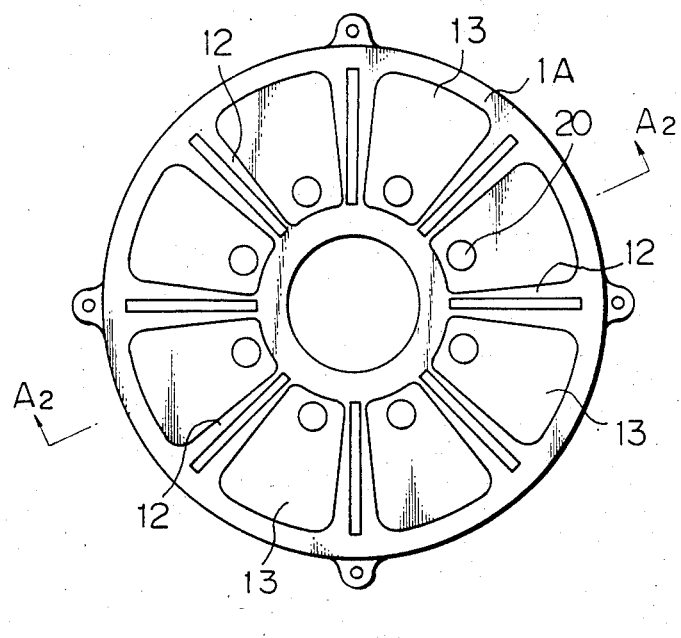
FIG. 4 is a bottom view of the induction coil according to the present invention.
Figure 5:
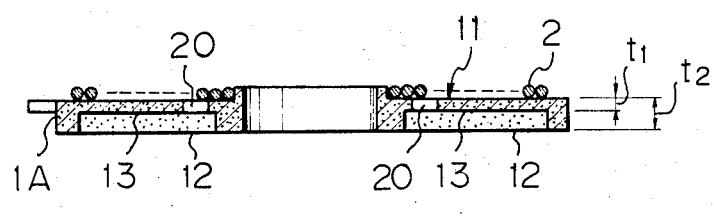
FIG. 5 is the cross section along the line A2—A2 of FIG. 4.

FIG. 4 is the bottom view of the coil support of the present invention, and FIG. 5 is the cross section along the line A2—A2 of FIG. 4. The figures in FIGS. 4 and 5 of the same as those in FIGS. 1 through 3 show the same members as those in FIGS. 1 through 3. The coil support 1 according to the present invention is made of complex ferrite material which is the mixture of thermal-stable insulation resin and sintered ferrite powder, instead of a prior thermal-stable insulation resin. The thermal-stable resin according to the present invention is for instance unsaturated polyester resin, or phenol resin.

The ratio of the sintered ferrite powder to the insulation resin mixture is, preferably, in the range between 75% and 85% in weight. If the ratio of the sintered ferrite powder to the total weight of the mixture is higher than that figure, the mechanical strength and/or the thermal stability of the coil support is destroyed. If the ratio of the ferrite powder is lower than that figure, the magnetic characteristics of the coil support is not enough for providing the effect of the present invention.

Preferably, the coil support 1A has a plurality of ribs 12, each of which is positioned in the back surface of the support 1A in the radial direction of the same with some angle intervals. It should be noted that the thickness of the support should be as much as possible so long as the prevention of leakage flux and the increase of the mechanical strength concern, however, the thick support has the disadvantage that the total weight of the coil support increases, and then, the producing cost of the same increases. The plurality of ribs 13 have the effect that they increase the mechanical strength of the support without increasing the thickness of the same, and increase the magnetic shield effect of the support. In a preferable embodiment, the length $t_1$ of the sector portions where no rib exists is $t_1 = 3.5$ mm, and the length $t_2$ of the ribs is $t_2 = 5$ mm, and that embodiment has the similar effect to the coil support which has no rib but has the uniform thickness of 5–7 mm in mechanical strength and magnetic characteristics. Preferably, the length $t_1$ is larger than 2 mm, and the width of a rib is larger than 5 mm. A rib may be integral with a coil support itself, alternatively, a separate rib is attached to the coil support. A rib is made of either the same material as that of the coil support itself, or ferrite which does not include resin.

Preferably, the number of ribs is equal to or larger than 5, and is still preferably in the range between 6 and 8. If the number of ribs is less than 4, it can not provide sufficient mechanical strength and magnetic shielding.

Still preferably, the coil support 1A has a plurality of holes 20 close to the inner side of the disc. Those holes function to uniform the magnetic flux between the outer side and the inner side by substantially decreasing the magnetic permiability of the support 1A in the inner portion of the disc.

Next, the preferable physical nature of the coil support is described.

It should be noted that ferromagnetic material like ferrite loses ferromagnetic nature at high temperature higher than the Curie point which is defined by each ferromagnetic material. When the coil support loses ferromagnetic nature, the inductance of the coil decreases considerably, and then, the frequency and/or the current applied to the coil varies very much, since the coil provides a resonant circuit with an external capacitor (not shown) coupled with a power source, thus, the heating ability of the burner is deteriorated. When food is cooked with oil on the present burner, the coil and/or the coil support is heated even up to 140°–150° C. in 30–60 minutes.

Accordingly, it is preferable that the Curie point of the coil support is higher than 150° C., and still preferably, it is higher than 180° C. When the coil support has the Curie point $T_c$ of that figure, almost all the cooking is accomplished lower than that Curie point.

As for the insulation resistance of the coil support, it is preferable that intrinsic resistance of the coil support is higher than $1 \times 10^4$ ohms-cm. When the coil support has the intrinsic resistance of that figure, no additional insulation process for the coil and the coil support is requested, and therefore, the manufacturing process of the coil is very simplified.

Further, it is preferable that the initial permeability of the coil support at room temperature at 1 kHz is higher than 7 ($\mu_i \geq 7$), so that the coil has sufficient inductance for heating.

Generally speaking, ferrite material with high Curie point has high insulation resistance, but has low initial permeability and low flux saturation level. Therefore, the above preferable nature of ferrite is accomplished by combining a plurality of original ferrites, and said preferable insulation resistance is obtained by the nature of ferrite itself without covering the coil support with insulation resin film. The original ferrites are selected from Ni-Zn ferrite, Mn-Zn ferrite, and Cu-Mg ferrite. The combination is performed so that a ferrite with high initial permeability and low Curie point and low intrisic resistance is combined with another ferrite with low initial permeability and high Curie point and high intrinsic resistance.

In the embodiment of the present invention, the first ferrite A which has high initial permeability and high saturation flux level but low Curie point Tc of 80°–120° C. and low intrinsic resistance less than $10^4$ ohms-cm is combined with the second ferrite B which has high intrinsic resistance ($1 \times 10^6$–$1 \times 10^{12}$ ohms-cm) and the high Curie point ($T_c = 200°$ C.). The combination ratio (weight ratio) of the first ferrite A and the second ferrite B (A:B) is in the range between 60:40 and 70:30.

The composition of that mixed ferrite is;
$Fe_2O_3$: 52–62 mol %
MnO: 23–27 mol %
ZnO: 10–20 mol %
MgO: 10–20 mol %
CuO: 0.5–8 mol %
NiO: 15–24 mol %

And, the resultant Curie point is Tc=180° C., and the intrinsic resistance is $1 \times 10^7$ through $1 \times 10^8$ ohms-cm.

Accordingly, a mixed ferrite with the Curie point Tc higher than 150° C., and the intrinsic resistance higher than $1 \times 10^4$ ohms-cm is obtained by the main compositions $Fe_2O_3$; 54–62 mol %, MNo; 23–33 mol %, ZnO; 9–20 mol %, and additives of MgO, CuO and NiO of more than 0.1 mol % each.

Figure 6:
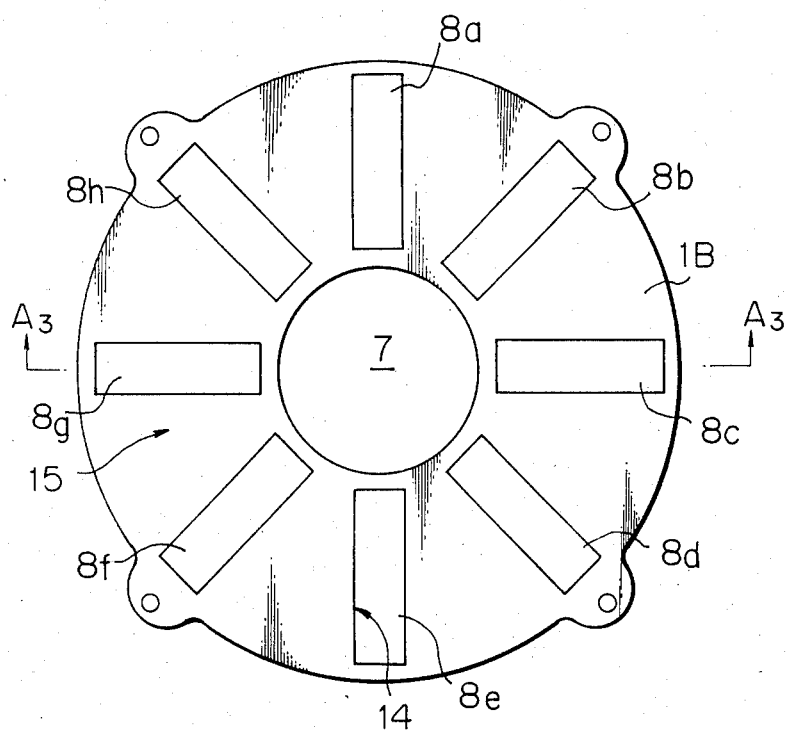
FIG. 6 is a bottom view of another embodiment of the induction heater burner according to the present invention.
Figure 7:
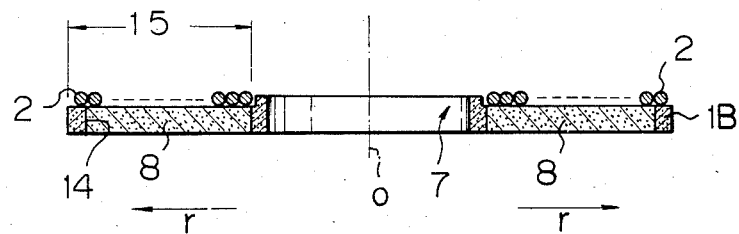
FIG. 7 is a cross section along the line A3—A3 of FIG. 6.
Figure 8:
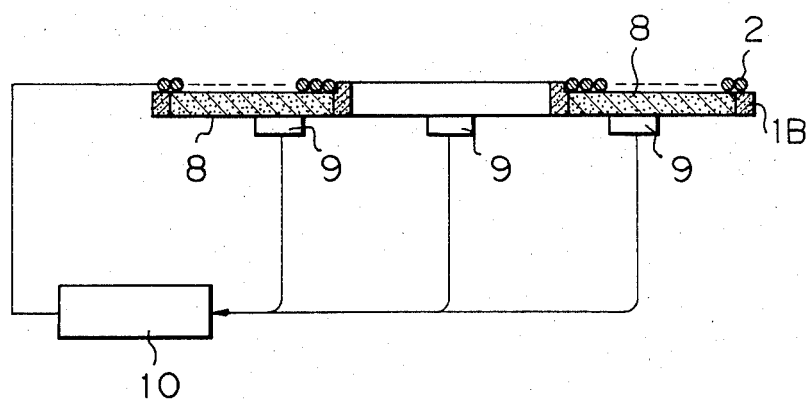
FIG. 8 is a circuit diagram of a temperature sensor mounted in the present induction heater burner.

Next, another embodiment of a coil support according to the present invention is described in accordance with FIGS. 6 through 8.

In FIG. 6, the coil support 1B is made of a mixture of insulation resin and ferrite powder with the weight ratio of ferrite in 75–85% as is the case of FIG. 4. And, the material of the coil support 1B has the nature that the Curie point Tc is higher than 150° C., and the intrinsic resistance is higher than $10^4$ ohms-cm, as is the case of FIG. 4. The feature of the embodiment of FIGS. 6 through 8 is the presence of a plurality of ribs 8a through 8h, each of which is attached to the circular coil support 1B. The ribs are made of ferrite itself so that the permeability of the coil support is essentially increased, although the base plate is made of mixture of insulation resin and ferrite powder. In the embodiment of FIG. 6, the base plate of the coil support 1B has a plurality of radial slots, in which a rib (8a through 8h) is inserted. The Curie point of each ribs is different from that of other ribs so that the ribs themselves function as a thermometer.

FIG. 8 shows the arrangement of the thermometer. In FIG. 8, the numeral 9 is detection means for detection of magnetic nature of the related rib 8. The detection means 8 are coupled electrically with the coil current control 10 which adjusts the currect in the coil 2. The detection means 9 detects the fact that the rib 8 located close to the means 9 loses the ferromagnetic nature because of the high temperature higher than the Curie point. Then, the coil current control 10 which includes an inverter circuit adjusts the current in the coil 2 so that the temperature of the coil is less than the allowable upper limit. Usually, the allowable upper temperature of the burner is in the range 100° C. and 250° C. Therefore, if the Curie point of the ribs 8a through 8h in FIG. 6 differ from one another, and distributes in 100°–250° C., the power applied to the coil 2 by the coil current control 10 is adjusted according to the instantaneous temperature of each ribs.

Figure 9:
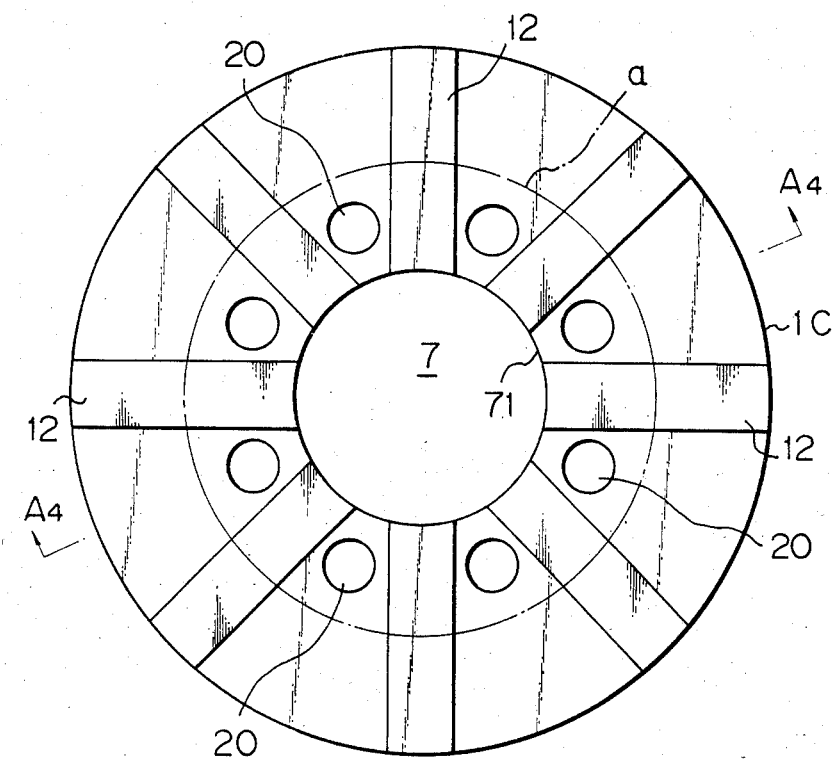
FIG. 9 is a bottom view of the still another embodiment of the induction heater burner according to the present invention.
Figure 10:
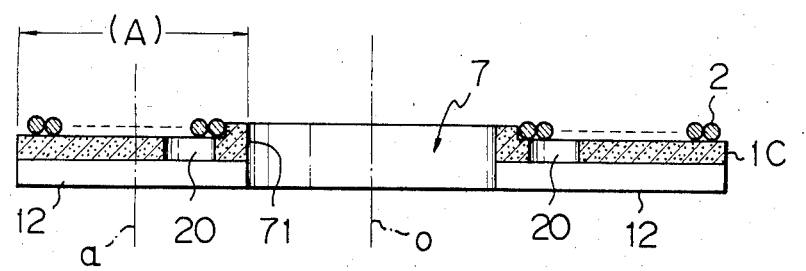
FIG. 10 is a cross section along the line A4—A4 of FIG. 9.
Figure 11:
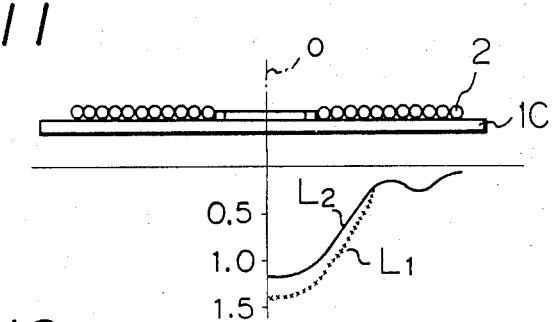
FIG. 11 shows a curve of flux density of an induction heater range.

Another embodiment is described in accordance with FIGS. 9 through 11, in which FIG. 9 is a bottom view of the coil support 1C, FIG. 10 is the cross section along the line A4—A4 of FIG. 9, and FIG. 11 is the curve of flux density. The coil support 1C of FIG. 9 is made of the same material of that of the previous embodiments, that is to say, the coil support 1C is made of a mixture of insulation resin and ferrite powder with the weight ratio of ferrite in 75–85%, and the material of the coil support 1C has the nature that the Curie point Tc is higher than 150° C., and the intrinsic resistance is higher than $10^4$ ohms-cm. Also, the coil support 1C has a plurality of radial ribs 12 made of ferrite material. Those ribs may have the different Curie point from one another as is the case of the previous embodiment.

The feature of FIG. 9 is the presence of a plurality of holes 20 which locate inner area of the disc 1C than the center circle (a). That center circle (a) is the center of the length (A) between the circumference 71 of the center hole 7 and the outer circumference. Those holes 20 function that the permeability at the inner portion of the disc 1C is essentially smaller than that of the outer portion of the disc.

When the permeability of the disc 1C is uniform, the magnetic flux generated by the coil 2 is dense at the inner portion of the disc, and is not dense at the output portion. The dotted curve L1 in FIG. 11 shows the magnetic flux when the permeability of the disc is uniform. The curve L2 in FIG. 11 shows the magnetic flux when the holes 20 are provided. In FIG. 11, the horizontal axis shows the length along the radial direction, and the vertical axis shows the flux density, and the figure along the vertical axis shows the ratio of the flux. As is apparent in FIG. 11, when the holes 20 are provided, the flux at the inner portion of the disc is not so high as that of the case where no hole is provided. The holes 20 have another advantage that the cooling effect through the ventilation through the holes is provided. Also, the embodiment of FIG. 9 has the advantage that the uniform heating for cooking is provided, and the load variation to the power source is decreased whether food is put at inner portion of the disc, or at the outer portion of the disc.

Figure 12:
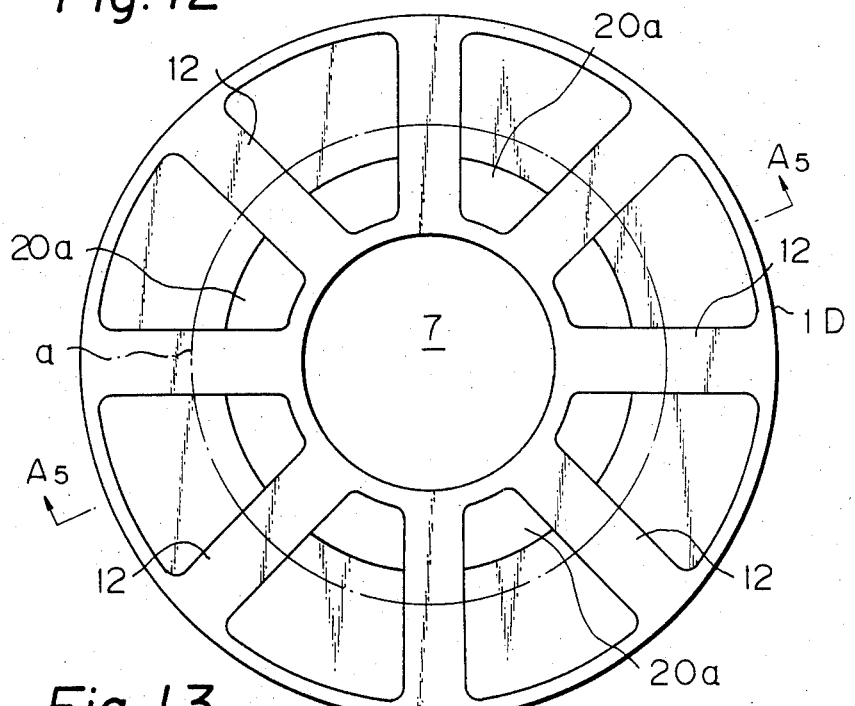
FIG. 12 is a bottom view of the modification of FIG. 9.
Figure 13:
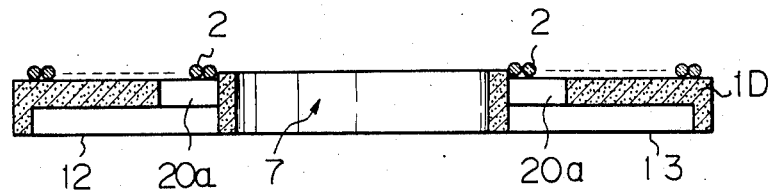
FIG. 13 is a cross section along the line A5—A5 of FIG. 12.

FIGS. 12 and 13 show the modification of FIGS. 9 through 11. The feature of FIGS. 12 and 13 is the shape of the holes. While the holes 20 in FIG. 9 are circular, the holes in FIG. 12 are in sector shape.

Figure 14:
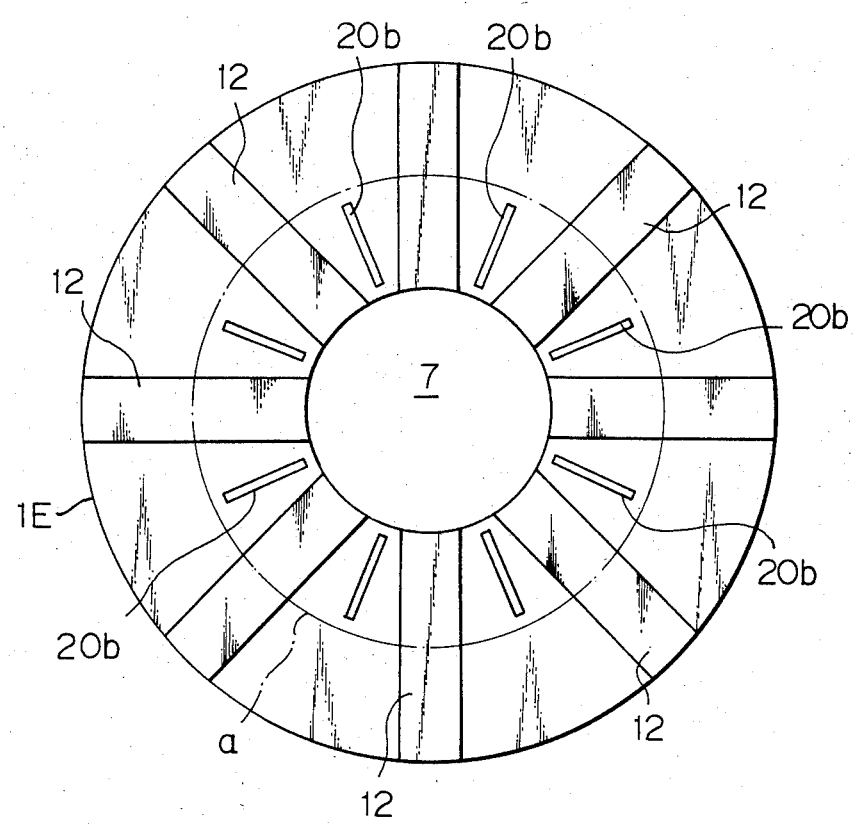
FIG. 14 is another modification of FIG. 12.

FIG. 14 shows another modification of a holes which are in the shape of thin linear slits.

Figure 15:
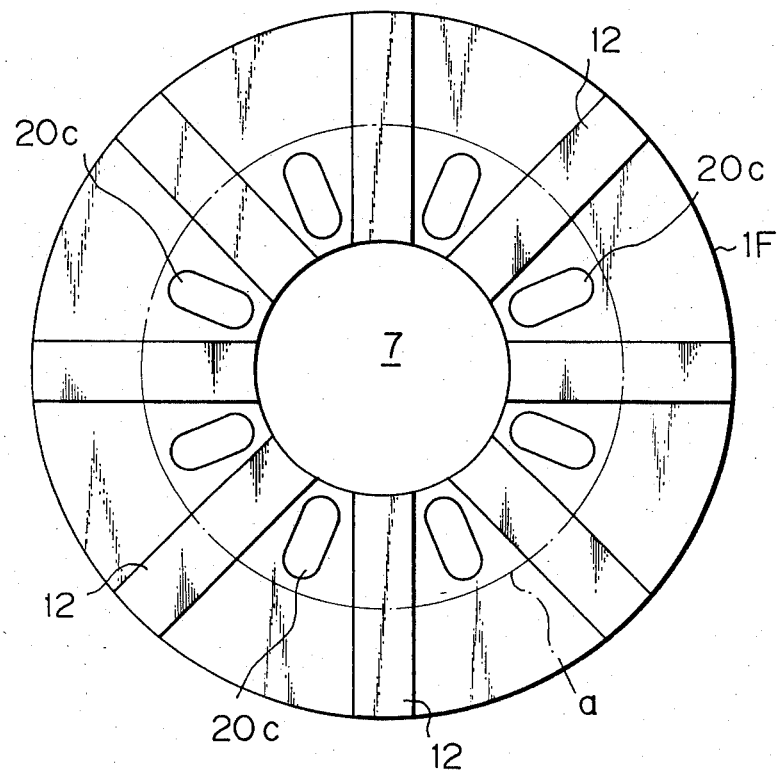
FIG. 15 is still another modification of FIG. 12.

FIG. 15 shows still another modification of the holes, in which the holes are in the shape of an ellipse.

From the foregoing it will now be apparent that a new and improved cold electric burner has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An induction cooking apparatus comprising a casing, a coil support mounted in the casing, an induction coil located on an upper plane of the coil support and being energized by high frequency power, and an insulation plate covering in the casing to provide a support for a load; characterized in that
said coil support is essentially a flat disc made of a mixture of heat-resistive insulation resin and ferrite powder so that the weight ratio of ferrite powder to mixture is in the range between 75% and 85%; and wherein said coil support has a non-uniform permeability so that the permeability at a center portion is essentially less than that at an outer portion.

2. An induction cooking apparatus according to claim 1, wherein said resin is one selected from an unsaturated polyester resin and a phenol resin.

3. An induction cooking apparatus according to claim 1, wherein said coil support has a plurality of longitudinal ribs made of ferrite extending radially on a bottom plane of the support.

4. An induction cooking apparatus according to claim 3, wherein each of said ribs has a width larger than 5 mm and a height larger than 2 mm.

5. An induction cooking apparatus according to claim 3, wherein each of said ribs is fixed in a slit provided in the coil support.

6. An induction cooking apparatus according to claim 3, wherein each of said ribs is adhered on the coil support.

7. An induction cooking apparatus according to claim 3 wherein each of said ribs is integral with the coil support.

8. An induction cooking apparatus according to claim 3, wherein the number of ribs is equal to or larger than 4.

9. An induction cooking apparatus according to claim 3, wherein the Curie point of each of the ribs differs from one to another.

10. An induction cooking apparatus according to claim 9, wherein the Curie point of said ribs is in the range between 100° C. and 250° C.

11. An induction cooking apparatus according to claim 10, including detection means for detecting the magnetic nature of a rib and located close to said rib so as to detect whether or not the temperature of said rib is higher than the Curie point.

12. An induction cooking apparatus according to claim 1, wherein said coil support has a Curie point higher than 150° C.

13. An induction cooking apparatus according to claim 1, wherein said coil support has an initial permeability larger than 7.

14. An induction cooking apparatus according to claim 1, wherein said coil support has an intrinsic resistance larger than $10^4$ ohms-cm.

15. An induction cooking apparatus according to claim 1, wherein said coil support has a plurality of openings at a center portion of the support.

16. An induction cooking apparatus according to claim 15, wherein said openings are through holes each provided between ferrite ribs.

17. An induction cooking apparatus according to claim 16, wherein each of said holes is a circular hole.

18. An induction cooking apparatus according to claim 16, wherein each of said holes is a longitudinal slit.

19. An induction cooking apparatus according to claim 16, wherein each of said holes is in the shape of an ellipse.

20. An induction cooking apparatus according to claim 16, wherein each of said holes is in a sector shape.

21. An induction cooking apparatus comprising a casing, a coil support mounted in the casing, an induction coil located on an upper plane of the coil support and being energized by high frequency power, and an insulation plate covering the casing to provide a support for a load; characterized in that
said coil support is essentially a flat disc made of a mixture of heat-resistive insulation resin and ferrite powder so that the weight ratio of ferrite powder to mixture is in the range between 75% ad 85: and wherein said ferrite powder is a mixed ferrite having the composition:
$Fe_2O_3$: 54–62 mol %,
$M_nO$: 23–33 mol %,
$Z_nO$: 9–20 mol %,
$M_gO$: more than 0.1 mol %.

* * * * *